United States Patent [19]

Cunningham

[11] Patent Number: 5,676,223
[45] Date of Patent: Oct. 14, 1997

[54] BUSINESS CASE

[75] Inventor: Robert J. Cunningham, Fort Lauderdale, Fla.

[73] Assignee: Eiffel Design, Inc., Boca Raton, Fla.

[21] Appl. No.: 618,444

[22] Filed: Mar. 19, 1996

Related U.S. Application Data

[62] Division of Ser. No. 391,495, Feb. 21, 1995, abandoned.

[51] Int. Cl.$^6$ .............. A45C 3/02; A45C 5/12; A45C 5/14; A45C 13/26
[52] U.S. Cl. .............. 190/109; 190/18 A; 190/110; 190/112; 190/115; 206/320
[58] Field of Search .............. 190/109–112, 901–903, 190/12, 10 A; 206/320

[56] References Cited

U.S. PATENT DOCUMENTS

| | | | |
|---|---|---|---|
| 2,213,821 | 9/1940 | McCurdy | 190/111 |
| 2,536,169 | 1/1951 | Gray | 190/901 X |
| 4,020,930 | 5/1977 | Weber | 190/901 X |
| 4,265,286 | 5/1981 | Rapoport | 190/900 X |
| 4,796,735 | 1/1989 | Horiuchi | 190/900 X |
| 4,854,431 | 8/1989 | Pulichino, Jr. et al. | 190/111 X |
| 4,854,432 | 8/1989 | Carpenter et al. | 190/111 X |
| 4,925,021 | 5/1990 | Pulichino, Jr. | 190/111 X |
| 5,010,988 | 4/1991 | Brown | 206/320 X |
| 5,105,338 | 4/1992 | Held | 190/903 X |
| 5,242,056 | 9/1993 | Zia et al. | 206/320 X |

FOREIGN PATENT DOCUMENTS 9008631  8/1990  WIPO .............. 190/112

*Primary Examiner*—Sue A. Weaver
*Attorney, Agent, or Firm*—Malin, Haley, DiMaggio & Crosby, P.A.

[57] ABSTRACT

A business case comprises a front compartment, middle compartment, an expandable rear compartment, a removable portable computer carrying case designed to carry a portable computer, and a suit carrier. The bag member can be dropped into one of two panels located on the front face of the front compartment. The panels additionally allow for easy access to a portable computer and related accessories stored within the carrying case. Alternatively, the carrying case can be closed and stored in the expandable rear compartment when the suit carrier is stored in the front compartment of the case. The middle compartment is sized to hold clothing and travel related items for business trips and is equipped with pouches for smaller items. Furthermore, the middle compartment of the housing may include wheels, handles, and feet for easily moving and balancing the case.

31 Claims, 9 Drawing Sheets

BUSINESS CASE

This is a division of application(s) Ser. No. 08/391,495 filed on Feb. 21, 1995, now abandoned.

BACKGROUND OF THE INVENTION

1. Field of the invention

This invention relates generally to a portable rolling business case, and, more particularly, to a carry-on-size case which holds a portable computer and related accessories and equipment in an easily accessible manner in addition to holding clothing and other travel articles.

2. Description of the Prior Art

Business bags such as brief cases which hold documents and files are well known in the prior art. Similarly, cases for portable computers and garment bags for carrying articles of clothing are well known. However, these cases are generally single purpose in nature and are not designed to be compatible with one another. As such, when making a short business trip a business person may carry a suitcase, a garment bag, and a portable computer bag for their computer. The combination of these single purpose cases often results in a clumsy array of disorganized luggage which exceeds the normal carry on limit of two bags. As a result, a business person may have to check their luggage thereby unnecessarily wasting time at an airport.

One example of a combination case is the "Business Traveler Wheeled Cart" style no. 190-20 produced by Monarch. This case has a lower pocket that opens into an expandable file and an upper "business organizer pocket" designed to hold a calculator, pens, a small note pad and possibly some business cards, airline tickets or credit cards. Additionally, the case opens into a larger interior compartment designed to hold clothing and other travel accessories. However, although this device may be able to replace a briefcase and suitcase for short business trips it cannot store a laptop computer in an easily accessible manner. Furthermore, the two pockets that hold business materials cannot be separated from the clothes carrying portion of the case. Lastly, there is no provision for storing a suit carrier within the case.

In light of the present state of the art there is a need for a business case that, in addition to carrying articles of clothing and other travelling accessories, can carry a removable portable computer bag in an easily accessible manner.

SUMMARY OF THE INVENTION

The business case of the present invention solves the problems encountered by the prior art by the provision of a novel easily accessible front accessory storage compartment and a correspondingly sized portable computer bag that fits into either the front compartment or a rear compartment. Additionally, the case can hold clothing and other travel accessories and is sized and shaped in such a way that it can be easily carried or rolled aboard an aircraft and stored in the overhead compartment or under a seat.

The present invention is directed toward a business case having at least three main compartments. The first compartment, located in the front of the case, is designed to carry either an opened portable (e.g. laptop) computer bag or a foldable suit carrier. Upper and lower access panels are disposed on the front surface of the front compartment which provide access to either the portable computer bag or the suit carrier contained within the front compartment. The upper access panel provides access to the top half of the portable computer bag and opens downwardly to a horizontal position. The lower access panel provides access to the lower portion of the bag member where a portable computer is stored. Additionally, the upper access panel is equipped with an exterior compartment for quick access and stowage.

A second, middle, compartment is connected to the front compartment and is internally separated therefrom by a rigidly framed moveable flap divider. Access to the middle compartment is provided by a rejoinable opening along the side of the business case which when opened also provides access to the rear of the front compartment. Generally the middle compartment is sized to hold clothing and other articles necessary during travel and is further provided with both upper and lower pouches for holding toiletries and other smaller traveling items that would otherwise move about during travel.

The business case further includes a third, rear, compartment which is expandable and serves a variety of functions. Access to the rear compartment is provided via a rejoinable opening along the top side and front surface of the rear compartment. Around the perimeter of the rear compartment is an expandable area that when opened allows a width W of material to expand along the sides of the rear compartment thereby increasing its depth. In the expanded form, the rear compartment is sized to hold a closed portable computer carrying bag. Unexpanded, the rear compartment has a relatively narrow depth compared to its expanded form and is sized to hold note pads, files, business planners, writing and calculating implements or the like.

The business case further includes a separate portable computer bag and suit carrier. When opened, the bag member folds about its unopened side into two halves. The interior portion of the top half is provided with an expandable panel that can store papers or computer accessories. On the external surface of the expandable panel are a plurality of small compartments for holding computer hardware such as a power supply, extension cords, and batteries. The lower half of the bag is adapted to hold a portable computer in addition to a removable panel that has pockets for floppy discs. The removable panel also serves as a buffer between the computer and the hardware stored in the top half of the bag when the bag is in the closed position.

Another feature of the business case is the suit carrier. The suit carrier has a plurality of foldable panels that can be opened into a flat surface. When laid flat, a suit can be laid onto the panel and secured to the same by straps and connectors. After securing the suit the panels can be folded to a closed position at which time the suit carrier is sized to fit within the front compartment of the business case in place of the portable computer bag.

It is an object of this invention to provide a business case that in addition to carrying articles of clothing, a suit carrier and other travel accessories, can store a portable computer in an easily accessible first compartment.

It is a further object of this invention to provide a business case having a removable bag that can hold a portable computer.

It is another object of this invention to provide a business case that can store a suit carrier in a first compartment when the portable computer bag is placed in the second compartment.

Other objects and advantages of the present invention will become apparent when the business case is considered in conjunction with the accompanying drawings.

BRIEF DESCRIPTION OF THE DRAWINGS

FIG. 10 is a perspective view of the suit carrier of the present invention in a closed position.

PREFERRED EMBODIMENT OF THE INVENTION

Figure 9:
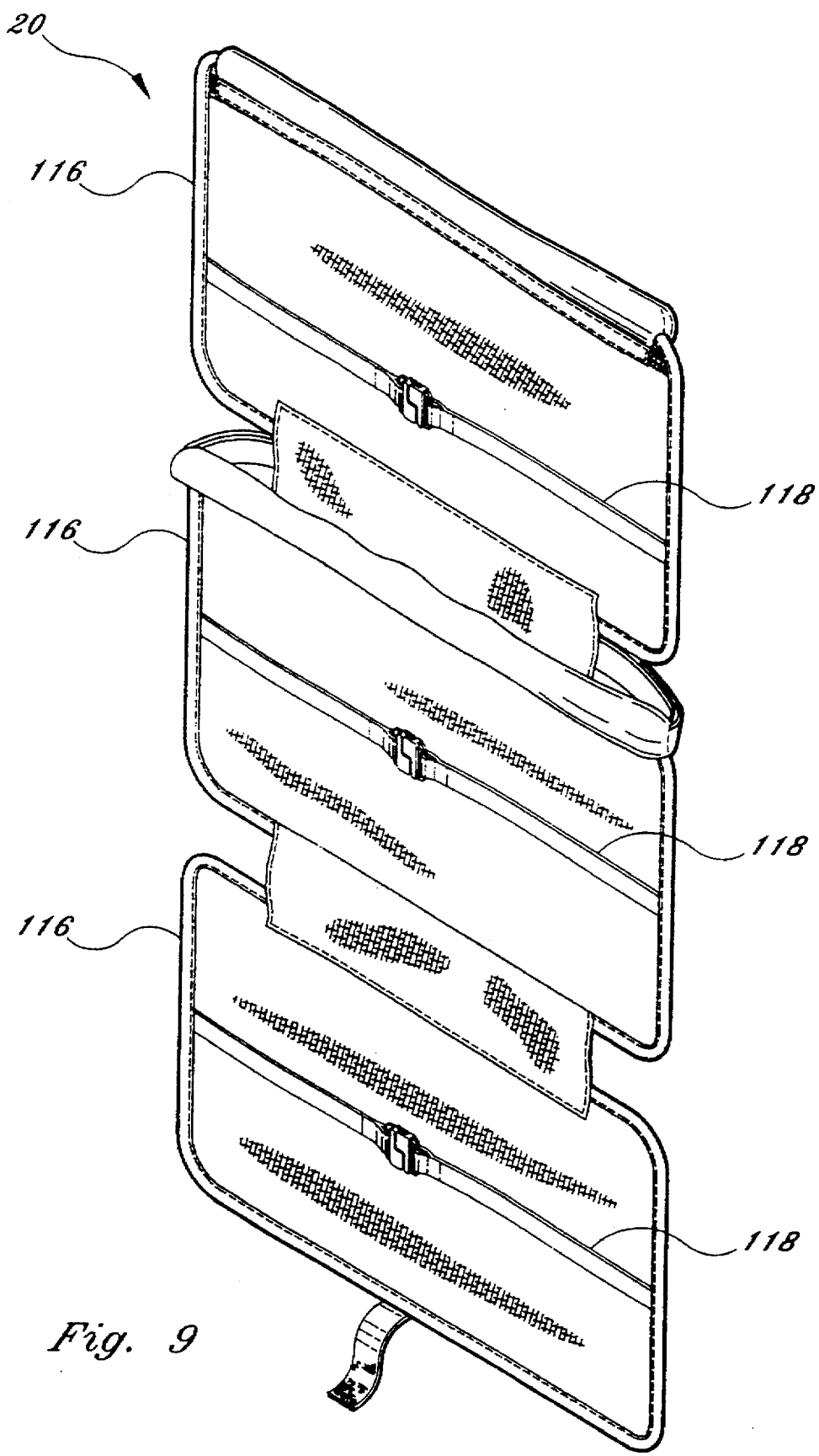
FIG. 9 is a perspective view of the suit carrier of the present invention in an open position.

With reference to FIGS. 1–4, there is depicted a rolling business case that is generally characterized by reference numeral 10. The business case 10 is comprised of front compartment 12, middle compartment 14, rear compartment 16, portable computer bag member 18 and suit carrier 20 (FIG. 9).

The front compartment 12 generally comprises an upper access panel 22, a lower access panel 24 and a quick access exterior compartment 26. Front compartment 12 is further defined by a front surface 36 and interior portion 38 shown in FIG. 5. In the preferred embodiment, as illustrated in FIGS. 1–4, front compartment 12 is permanently attached to middle compartment 14 along a portion of left side 28 and is rejoinably attached via zipper 54 or any other suitable releasable connector to middle compartment 14 along top side 30, bottom side 32, right side 34 and the remaining portion of left side 28.

Figure 1:
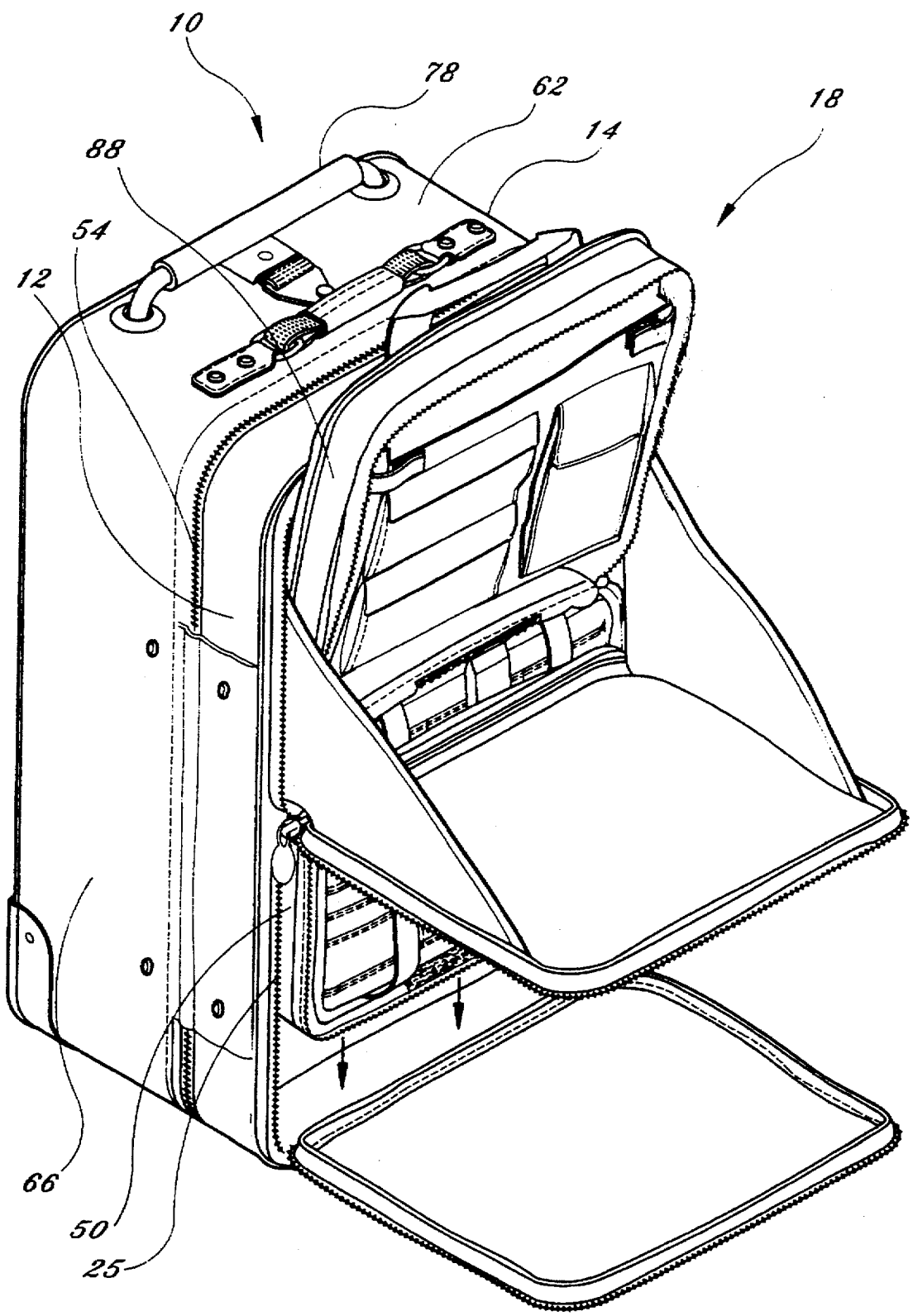
FIG. 1 is a front perspective view of the business case of the present invention illustrating one method of inserting the removable bag.
Figure 2:
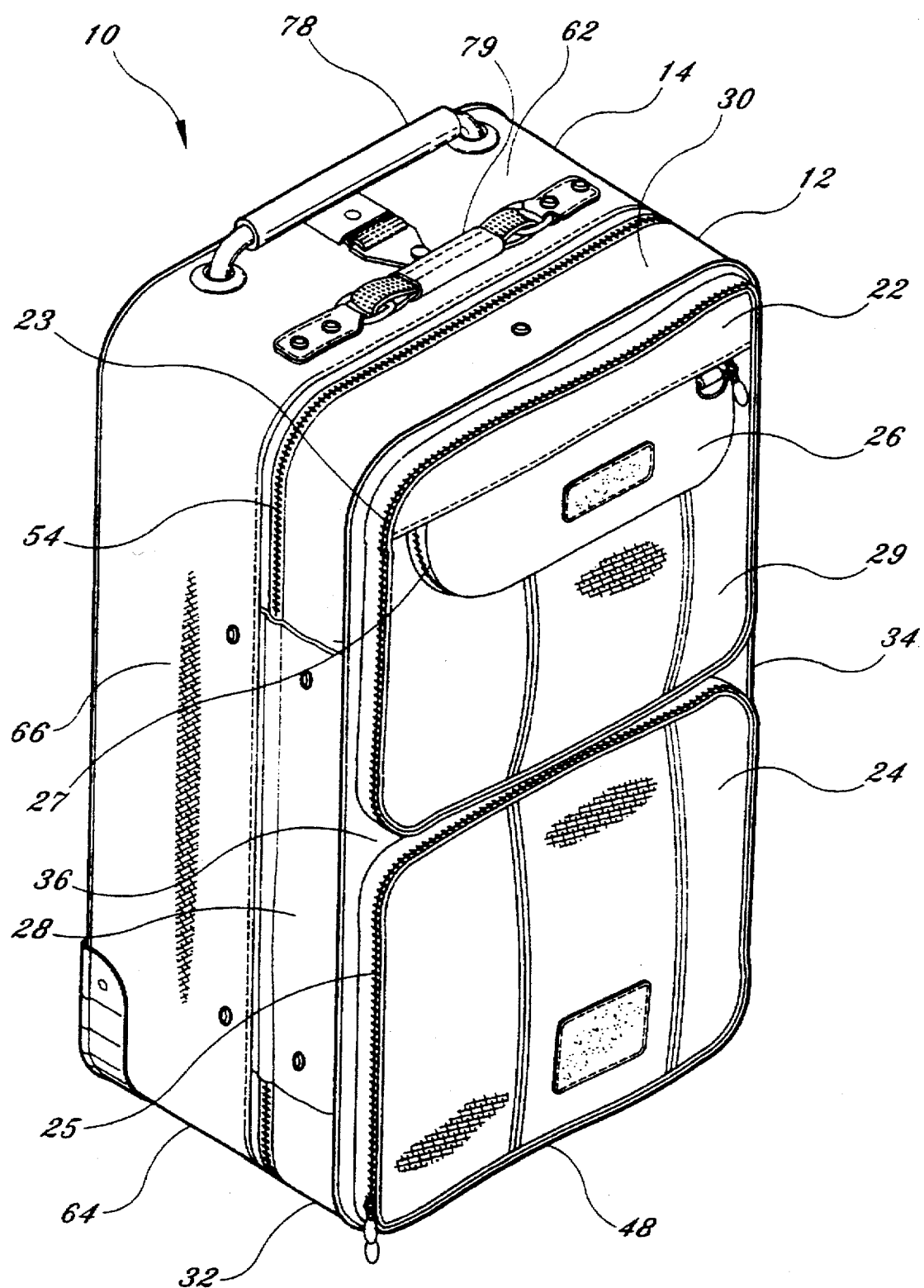
FIG. 2 is a front perspective view of the business case of the present invention with the top and bottom access panels in a closed position.
Figure 3:
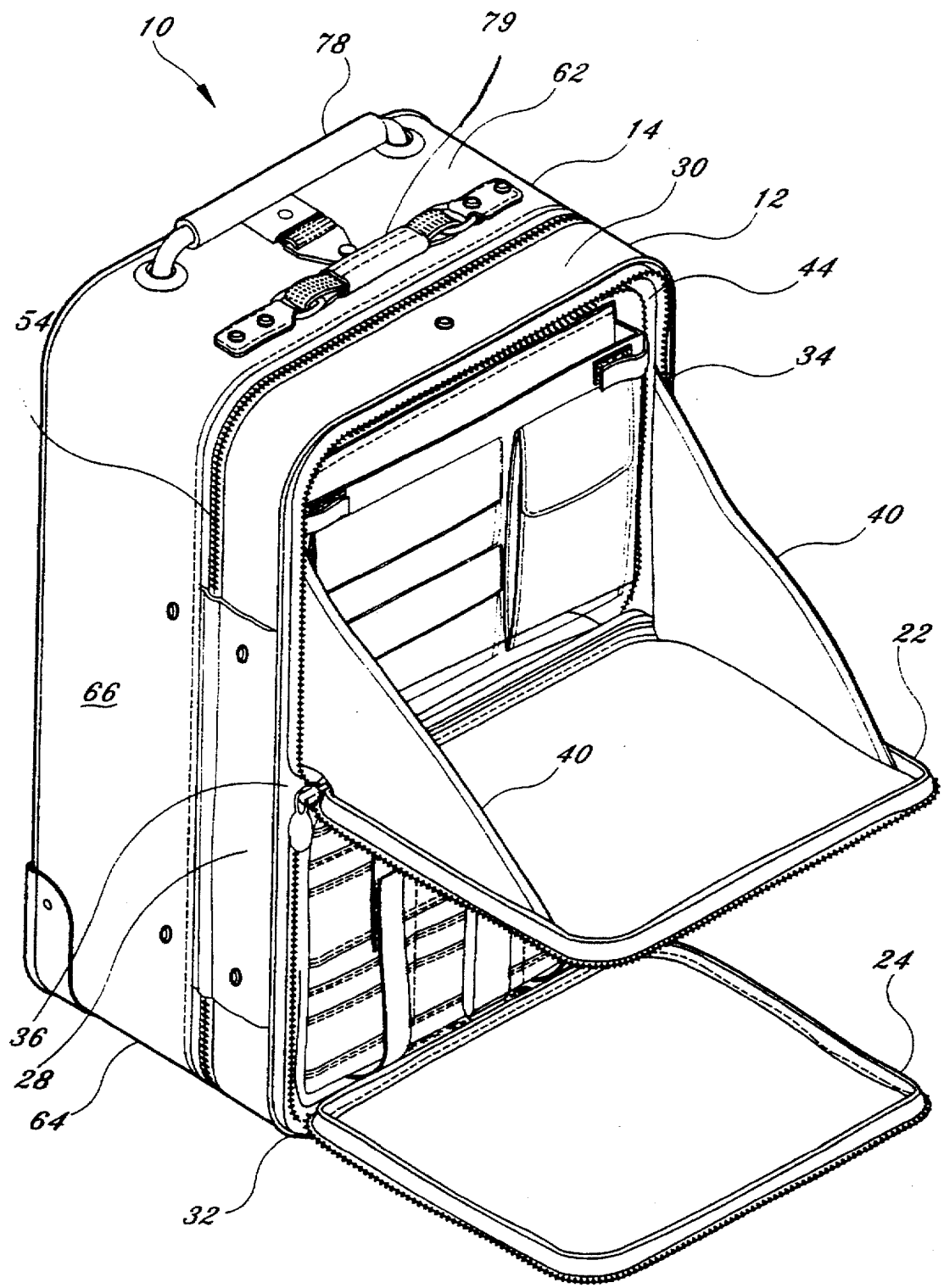
FIG. 3 is a front perspective view of the business case of the present invention with the top and bottom access panels in an open position.

Disposed within and connected to front surface 36 are upper access panel 22 and lower access panel 24. Upper access panel 22 is partially connected to front surface 36 by rejoinable means such as zipper 23. In the open position, as shown in FIG. 3, upper access panel 22 folds about its bottom edge to a horizontal position where it is supported by side webbing 40 that is connected to the body of front compartment 12 and panel 22. Furthermore, as shown in FIG. 2, upper access panel 22 is designed such that the portable computer bag 18 can be dropped through opening 44 in front compartment 12 created by panel 22 in its open position as shown in FIG. 1. Upper access panel 22 is further equipped with an exterior compartment 26 for quick access storage purposes. Preferably, exterior compartment 26 is accessible through a U-shaped rejoinable opening 27 on the front face 29 of panel 22.

Figure 6:
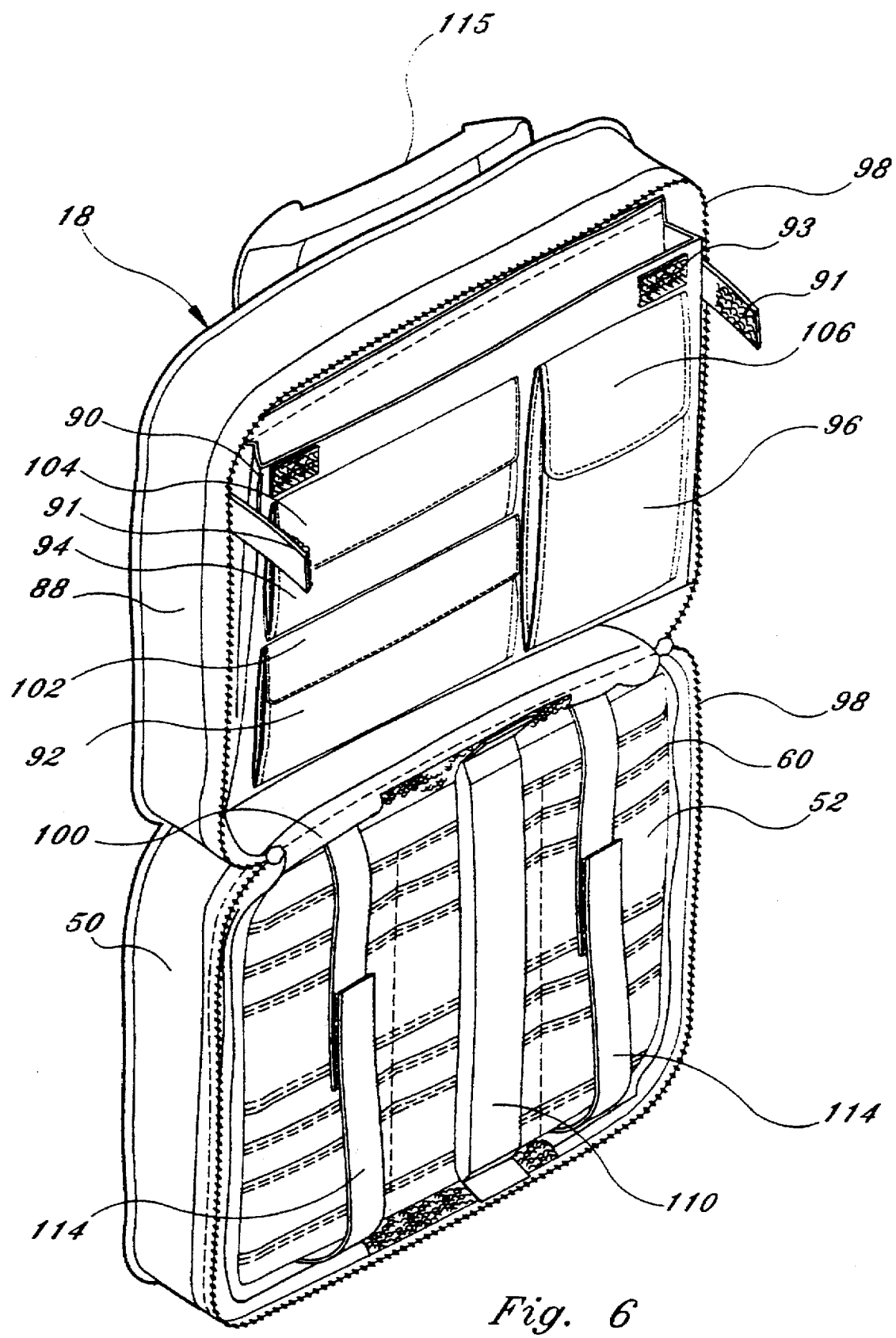
FIG. 6 is a perspective view of the bag member of the present invention.

The lower access panel 24 is rejoinably connected to the front compartment by rejoinable means 25 in a manner similar to upper access panel 22 discussed supra. When opened, lower access panel 22 folds about its bottom edge where the panel is permanently connected to front compartment 12. In the open position, access to the lower half 50 of bag 18 is permitted. Lower half 50 defines a hollow interior adapted to hold the portable computer which is covered by removable panel 52 as shown in FIG. 6.

Figure 5:
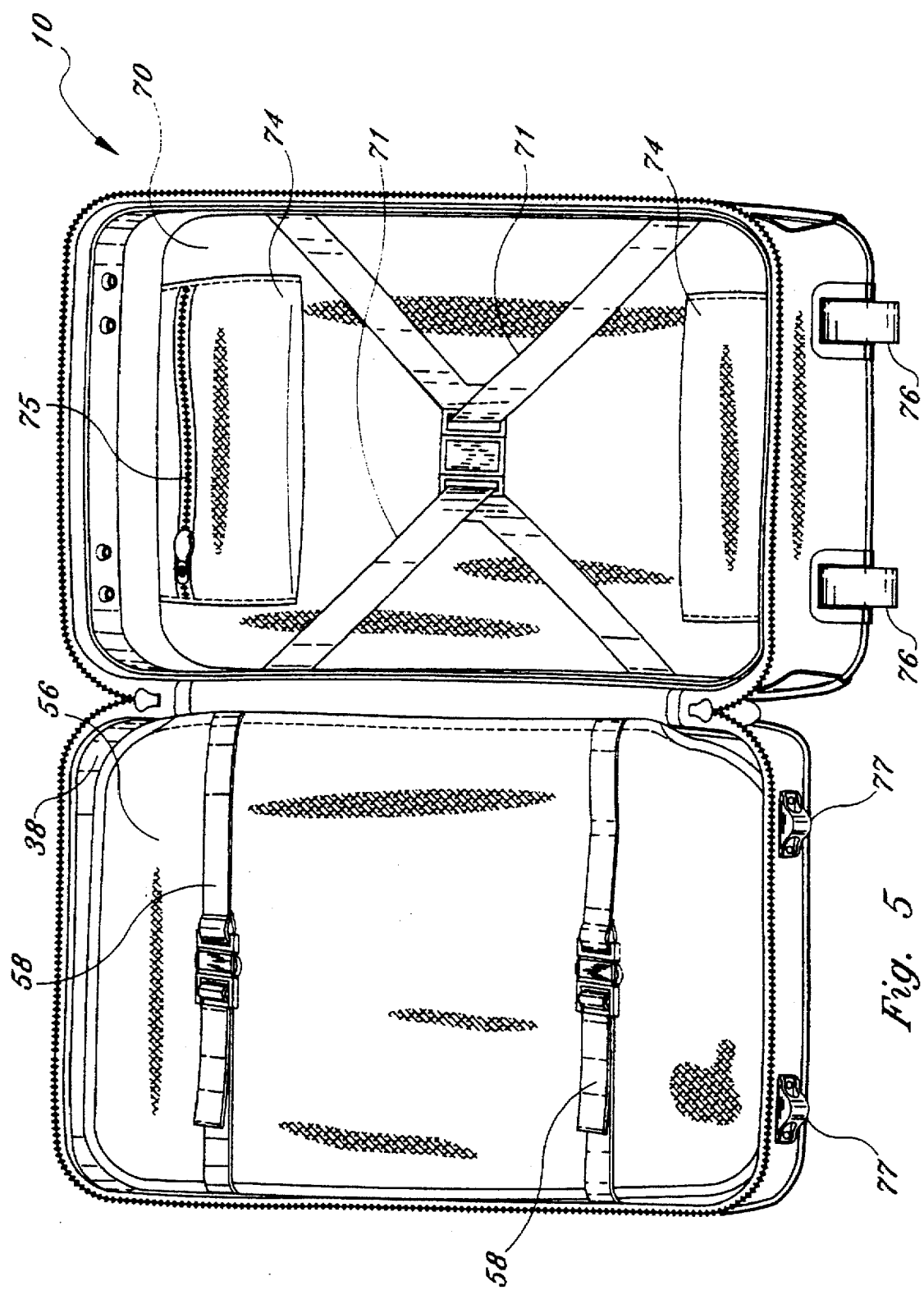
FIG. 5 is a front elevational view of the business case showing the interior of the front and middle compartments.

In the preferred embodiment front compartment 12 is partially separable from middle compartment 14 of business case 10 by rejoinable means 54. Front and middle compartments 12 and 14 are internally separated from each other by a rigid frame flap divider 56 as shown in FIG. 5. When the front and middle compartments 12 and 14 respectively are opened along rejoinable means 54, internal access to each of said compartments is permitted. Furthermore, in the open position, as shown in FIG. 5, flap 56 may be flipped to cover either the rear of front compartment 12 or the front of middle compartment 14. Preferably, flap 56 is secured to the rear of front compartment 12 by straps 58 thereby securing either bag 18 or suit carrier 20 within front compartment 12.

Figure 4:
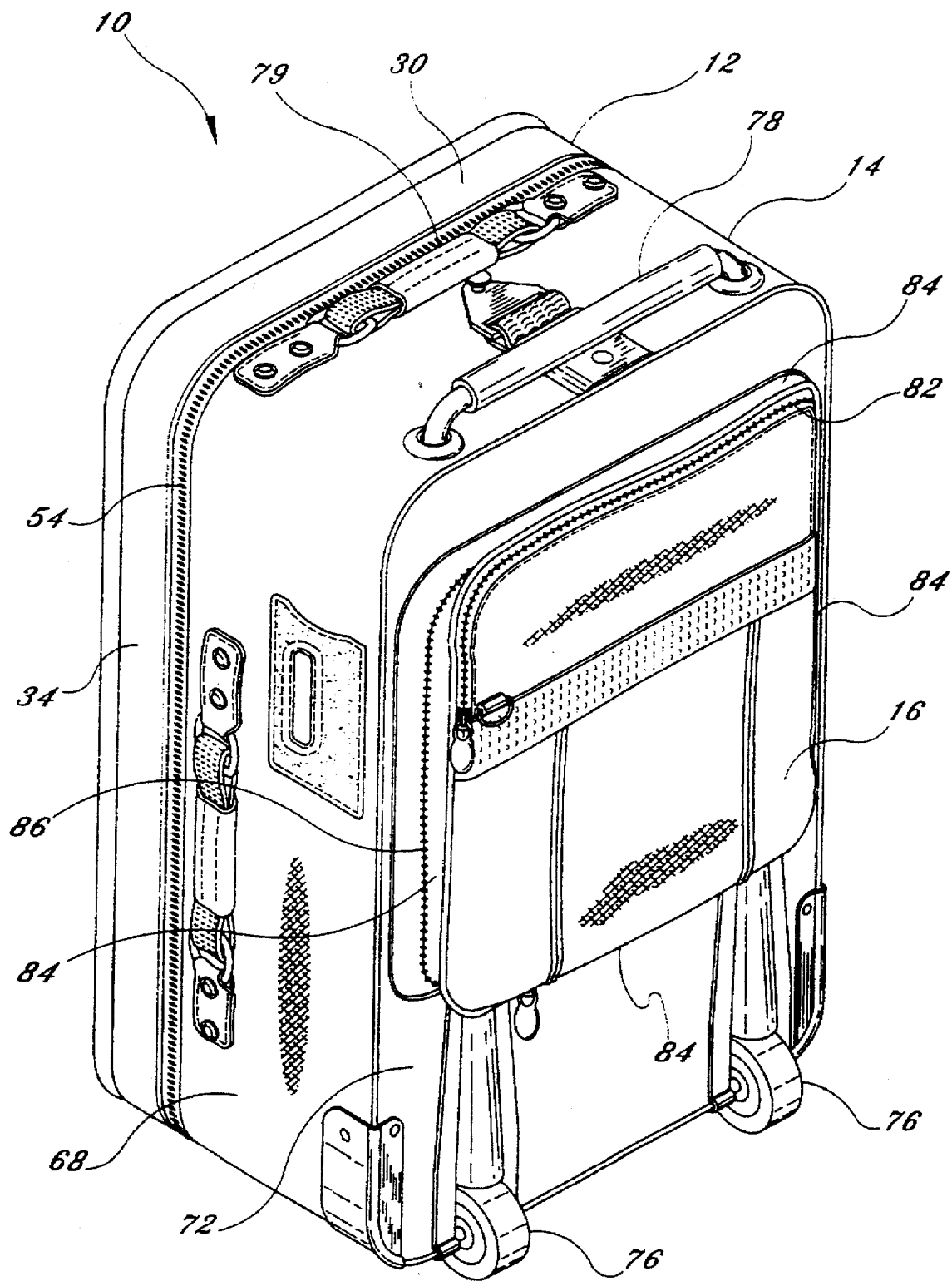
FIG. 4 is a rear perspective view of the business case.

With reference to FIGS. 3–5 middle compartment 14 generally comprises a top exterior surface 62, bottom exterior surface 64, left exterior surface 66, right exterior surface 68, interior surface 70 and back side 72. Preferably, middle compartment 14 is the largest of the three main compartments and is designed to hold clothing and other articles necessary during travel. Middle compartment 14 is also provided with both upper and lower pouches 74 which are joined to interior surface 70. Pouches 74 have rejoinable openings 75 and are sized to hold toiletries and other smaller traveling items that would otherwise move about during travel. Furthermore, middle compartment 14 is provided with connecting clothes securing straps 71 wheels 76, handles 78 and 79 and feet 77 for easily moving and balancing the business case of the present invention.

Figure 8:
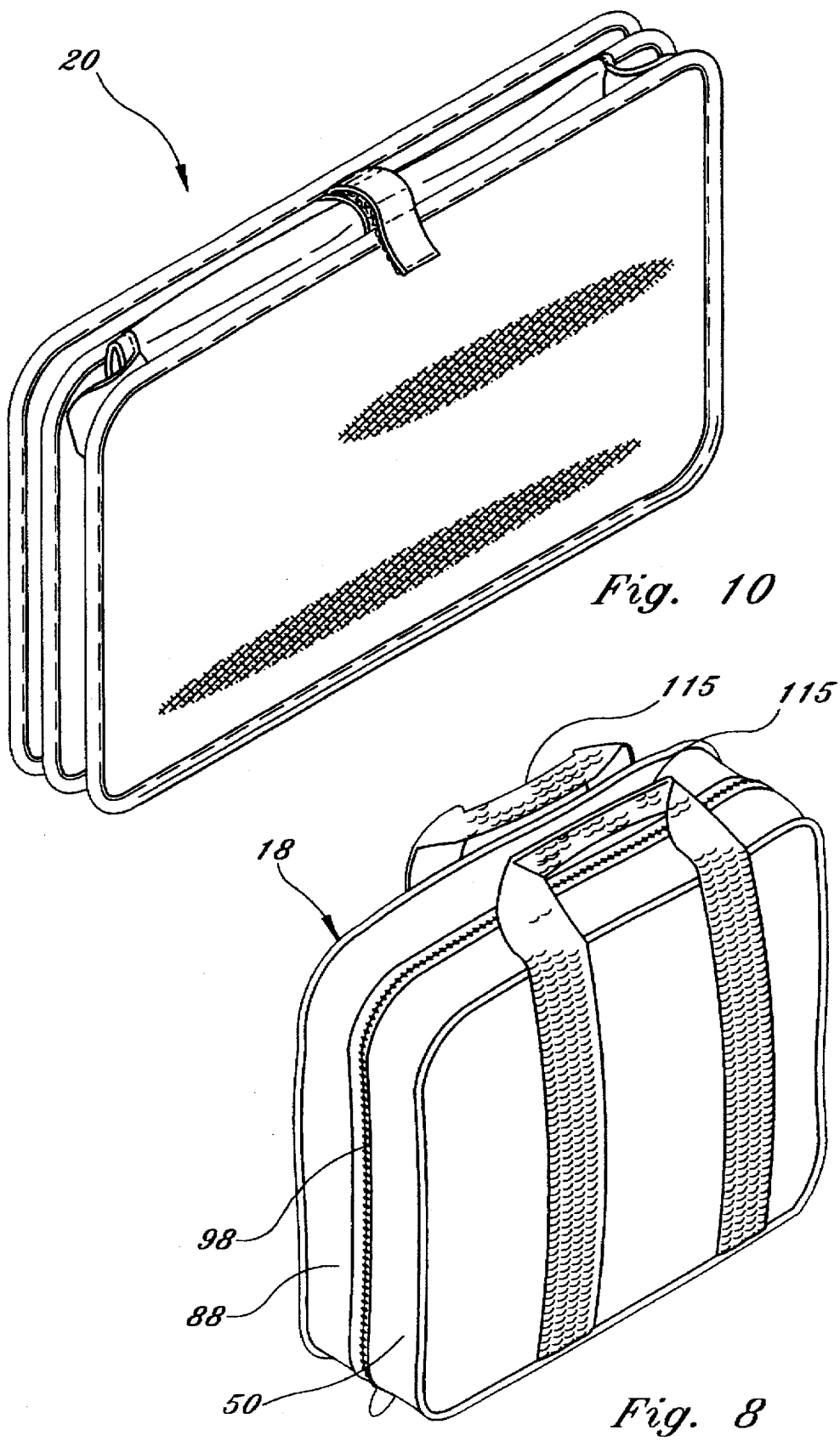
FIG. 8 is a perspective view of the bag member in the closed position.

With reference to FIG. 4, rear compartment 16 of business case 10 is the smallest compartment. Among other purposes disclosed herein rear compartment 16 serves as an auxiliary location to store bag 18 when said bag is in the closed position as shown in FIG. 8 and said compartment 16 is in its expanded form. Rear compartment 16 is connected along its back side (not shown) to back side 72 of middle compartment 14. Preferably, rear compartment 16 is accessed via rejoinable opening 82 on the face of the compartment as shown in FIG. 4. When unexpanded, rear compartment 16 has a shallow depth relative to its expanded form and serves as a general all purpose storage area. Around perimeter sides 84 of rear compartment 16 is rejoinable opening 86 which when opened allows a width of material to expand along sides 84 of the rear compartment thereby increasing the depth of the compartment.

Figure 7:
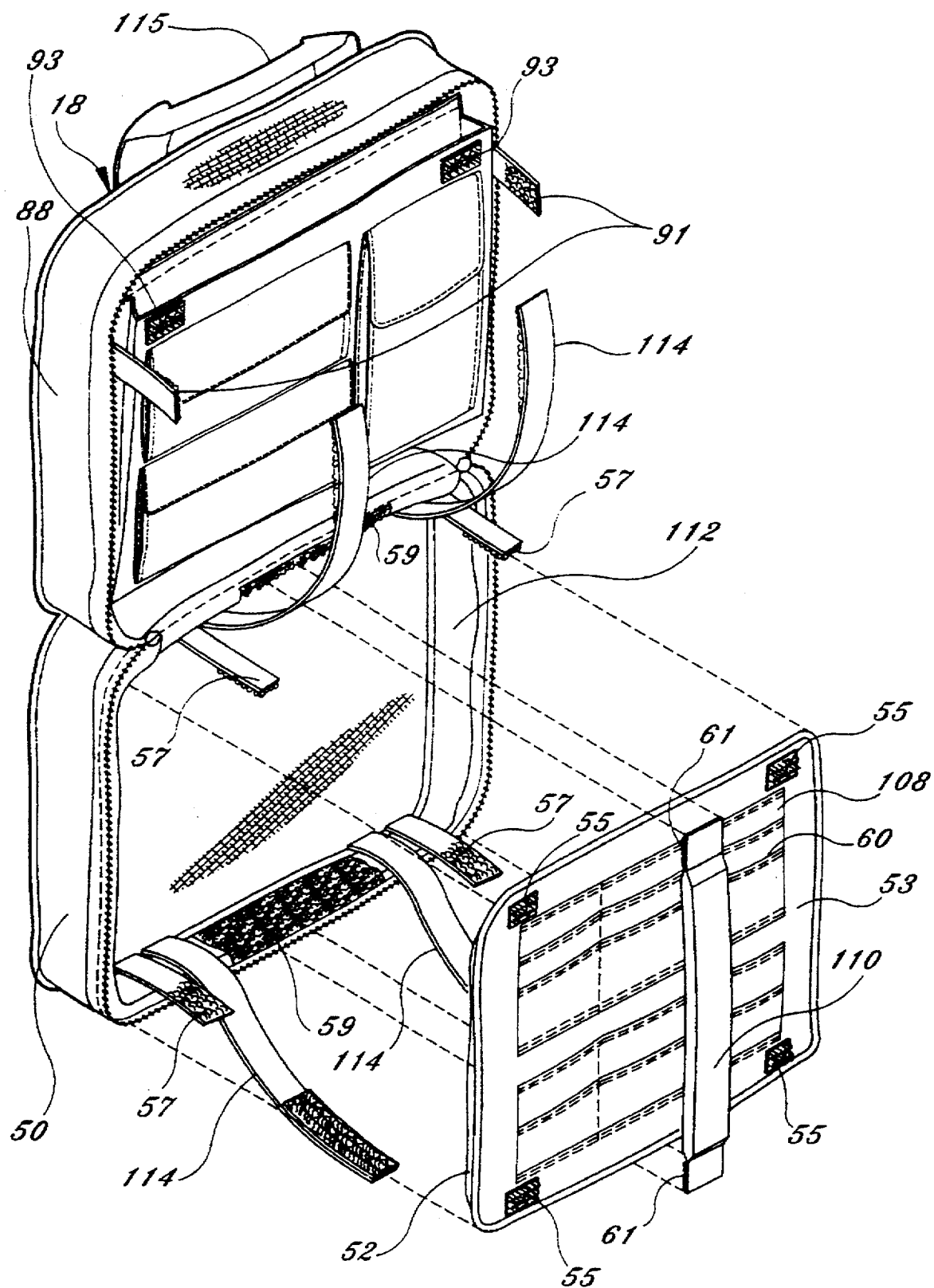
FIG. 7 is an exploded view of the bag member of the present invention.

With reference to FIGS. 6–10 business case 10 further includes the previously mentioned removable portable computer bag 18 and suit carrier 20. The laptop bag, as shown in FIGS. 6, 7 and 8 comprises a top half 88, bottom half 50, expandable panel 90, compartments 92, 94 and 96, removable panel 52, spacer 110, internal surface 112, straps 114 and handles 115. Top half 88 and bottom half 50 of bag 18 are joined in part by rejoinable means 98. When opened bag 18 folds about the permanently joined portion 100 into two halves 88 and 50 as shown in FIGS. 6 and 7. The top half 88 is provided with expandable panel 90 suitable for storing papers, computer accessories or similarly sized articles. On the external surface of expandable panel 90 are a plurality of small compartments 92, 94, 96 for holding computer hardware such as a power supply, extension cords, and batteries. Expandable panel 90 is retained in an unexpanded position by hook fastener tabs 91 connected to loop patches 93 on the external of said panel.

Compartments 92–96 have flaps 102, 104 and 106 respectively that attach to the outer faces of the compartments preferably by means of hook and loop fasteners. It is realized however that where hook and loop fasteners are used in this invention other attachment means such as snaps, zippers, clips, buttons and like fastening devices are available and the present invention is intended to cover such embodiments.

The lower half 50 of bag 18 forms the computer compartment. Within lower half 50 is disposed removable panel 52. Preferably panel 52 is made from a nylon covered high density foam material that shields the computer from contact with the hardware stored in top half 88 of bag 18. Additionally, floppy disc pockets 60 are sewn on the nylon covered top surface 53 of panel 52. Pockets 60 are sized to hold standard 3.5" and/or 5.25" floppy computer discs although they may be any size depending on the need. The top surface 53 of panel 52 is further provided with loop patches 55 that engage fastener tabs 57 which secure said panel within lower half 50.

With reference to FIG. 7, after setting a portable computer in lower half 50, removable panel 52 is placed on top of the computer and is secured to lower half 50 by hook fasteners tabs 57. Next, spacer 110 is attached to inner surface 112 hook fastener 61 to loop patches 59 between removable panel 52 and top half 88. Preferably, spacer 110 is a nylon covered high density foam material capable of absorbing shock and preventing contact between the computer contained in lower half 50 and the hardware and other materials stored in top half 88. Additionally, straps 114 which are sewn at one end to interior surface 112 extend above top surface 53 where they join together preferably with hook and loop fasteners thereby further securing removable panel 52 against the computer within the lower half 50 of bag 18.

Bag 18 is preferably made of a flexible material such as nylon. However, the term bag in this invention is intended to cover rigid surfaced containers as well.

Another feature of the business case 10 is suit carrier 20. Suit carrier 20 has a plurality of foldable panels 116 that open into a flat surface as shown in FIG. 9. When in the open flat position, a suit is laid onto panels 116 and secured to the same by straps 118. Upon securing the suit, panels 116 are folded to a closed position as shown in FIG. 10. In the closed position suit carrier 20 is sized to fit within front compartment 12 of business case 10 in place of the portable computer bag 18.

In the preferred embodiment, rejoinable, rejoinable openings, rejoinable means and rejoinably connected generally refer to a zipper connection unless otherwise indicated. In alternative embodiments, however, it is realized that the rejoinable openings, rejoinable means and rejoinable connections can be buttons, hook and loop fasteners, snaps, clips and like fastening devices and the present invention is envisioned to encompass such other embodiments. It is further realized that the rejoinable connectors disclosed may be used in any combination.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A business case comprising:
    a receptacle, said receptacle having a first half defining a portable computer storage volume and a second half defining a computer accessory storage volume, said first and second receptacle halves foldably connected together folding between a first, opened, position in which said first and second halves are substantially coplanar and a second, folded position in which said first and second halves are face to face;
    a housing including at least a first and a second compartment, said first compartment defining a receptacle storage volume sized to receive said receptacle while said receptacle is in said open position; and
    means for rejoinably connecting said first compartment to said second compartment;
    wherein said receptacle is removably disposed within said receptacle storage volume while said receptacle is in said open position to provide access to said portable computer storage volume while said receptacle is disposed within said receptacle storage volume.

2. The business case according to claim 1 wherein said housing further includes a third compartment, said third compartment connected to said second compartment.

3. The business case according to claim 2, wherein said third compartment further includes an expandable surface which can be moved between an expanded and an unexpanded position, and when said expandable surface is in said expanded position said third compartment is sized to receive said receptacle when said receptacle is in said closed position.

4. The business case according to claim 1 wherein said first compartment includes at least one openable access panel, said panel defining an opening sized to receive said receptacle in said open position and to provide access to said portable computer storage volume.

5. The business case according to claim 4, wherein said at least one openable access panel includes means to form a stable horizontal support surface when said openable access panel is in an open position.

6. The business case according to claim 4 wherein said first compartment includes two openable access panels, each of said panels defining an opening sized to receive said receptacle in said open position and to provide access to each of said storage volumes defined by said first and second receptacle halves while said receptacle is received in said first compartment in said open position.

7. The business case according to claim 6, wherein each of said openable access panels includes means to form a stable horizontal support surface when said openable access panel is in an open position.

8. The business case according to claim 6 wherein said housing further includes a third compartment, said third compartment connected to said second compartment.

9. The business case according to claim 8, wherein said third compartment further includes an expandable surface which can be moved between an expanded and an unexpanded position, and when said expandable surface is in said expanded position said third compartment sized to receive said receptacle when said receptacle is in said closed position.

10. The business case according to claim 1, further comprising a foldable suit carrier, said suit carrier sized to fit within said first or second compartments when said suit carrier is in a folded position.

11. The business case according to claim 1, further including a movable rigid framed flap and means for supporting said flap, said flap separating said first compartment from said second compartment.

12. The business case according to claim 1, wherein said receptacle further includes at least one internally disposed removable panel.

13. The business case according to claim 12, wherein said at least one removable panel further includes at least one pocket sized to hold a floppy computer disk.

14. The business case according to claim 1 wherein said housing further includes means for rolling along the ground and a retractable handle.

15. The business case according to claim 1 including means for rejoinably connecting said receptacle first half and said receptacle second half.

16. A business case of the type having a first compartment and a second compartment, each of said first and second compartments including a substantially planar side panel circumscribed by a peripheral wall, each of the peripheral walls having a free edge, a first portion of each free edge forming a hinge interconnecting said first and second compartments, a second portion of each free edge including means to rejoinably connect said first and second compartments, the case including means for rolling along the ground, a retractable handle, and being sized for hand carry on an airline, comprising in combination therewith:

a portable computer receptacle having a computer storage compartment and a computer accessories compartment, said receptacle being foldable between a first, opened, position in which said computer storage compartment and said computer accessories compartment are substantially coplanar and a second, folded position in which said computer storage compartment and said computer accessories compartment are face to face;

said portable computer receptacle including means for rejoinably connecting together in face to face relation said computer storage compartment and said computer accessories compartment;

said business case first compartment sized to receive said portable computer receptacle in said open position, said first compartment including two openable access panels in said first compartment side panel for access to said computer storage compartment and said computer accessories compartment, at least one of said openable access panels sized to allow said receptacle to be passed through an aperture defined by said at least one openable access panel when said receptacle is in said open position;

wherein said portable computer receptacle is capable of being disposed in said first compartment in said open position, and said computer storage compartment and said computer accessories compartment are accessible through said openable panels.

17. The business case according to claim 16, wherein each of said openable access panels includes means to form a stable horizontal support surface when said openable access panel is in an open position.

18. The business case according to claim 16 further including a third compartment, said third compartment connected to said second compartment.

19. The business case according to claim 18, wherein said third compartment further includes an expandable surface which can be moved between an expanded and an unexpanded position, and when said expandable surface is in said expanded position said third compartment defines a third compartment storage volume sized to receive said portable computer receptacle when said receptacle is in said closed position.

20. The business case according to claim 16, further comprising a foldable suit carrier, said suit carrier sized to fit within said first or second compartments when said suit carrier is in a folded position.

21. The business case according to claim 16, further including a movable rigid framed flap and means for supporting said flap, said flap separating said first compartment from said second compartment.

22. The business case according to claim 16, wherein said portable computer receptacle further includes at least one internally disposed removable panel.

23. The business case according to claim 22, wherein said at least one removable panel further includes at least one pocket sized to hold a floppy computer disk.

24. A business case of the type having a first compartment and a second compartment, each of said first and second compartments including a substantially planar side panel circumscribed by a peripheral wall, each of the peripheral walls having a free edge, a first portion of each free edge forming a hinge interconnecting said first and second compartments, a second portion of each free edge including means to rejoinably connect said first and second compartments, the case including means for rolling along the ground, a retractable handle, and being sized for hand carry on an airline, comprising in combination therewith:

a portable computer receptacle having a computer storage compartment and a computer accessories compartment, each of said compartments having a substantially planar side panel circumscribed by a peripheral wall, each of said peripheral walls having a free edge with a first portion and a second portion;

means, connected at said first portion of each of said free edges of said peripheral walls of said portable computer receptacle compartments, for folding said portable computer receptacle between a first, opened, position in which said computer storage compartment and said computer accessories compartment are substantially coplanar and a second, folded, position in which said computer storage compartment and said computer accessories compartment are face to face with said second portion of each of said free edges proximate each other;

means for rejoinably connecting together said second portions of each of said free edges of said portable computer storage compartments;

said business case first compartment sized to receive said portable computer receptacle in said open position, said first compartment including two openable access panels in said first compartment side panel for access to said computer storage compartment and said computer accessories compartment, at least one of said openable access panels sized to allow said receptacle to be passed through an aperture defined by said at least one access panel when said receptacle is in said open position;

wherein said portable computer receptacle is capable of being disposed in said first compartment in said open position, and said computer storage compartment and said computer accessories compartment are accessible through said openable panels.

25. The business case according to claim 24, wherein each of said openable access panels includes means to form a stable horizontal support surface when said openable access panel is in an open position.

26. The business case according to claim 24 further including a third compartment, said third compartment connected to said second compartment.

27. The business case according to claim 26, wherein said third compartment further includes an expandable surface which can be moved between an expanded and an unexpanded position, and when said expandable surface is in said expanded position said third compartment defines a third compartment storage volume sized to receive said portable computer receptacle when said receptacle is in said closed position.

28. The business case according to claim 24, further comprising a foldable suit carrier, said suit carrier sized to fit within said first or second compartments when said suit carrier is in a folded position.

29. The business case according to claim 24, further including a movable rigid framed flap and means for supporting said flap, said flap separating said first compartment from said second compartment.

30. The business case according to claim 24, wherein said portable computer receptacle further includes at least one internally disposed removable panel.

31. The business case according to claim 30, wherein said at least one removable panel further includes at least one pocket sized to hold a floppy computer disk.

* * * * *